United States Patent
Kim et al.

(10) Patent No.: US 9,102,324 B2
(45) Date of Patent: Aug. 11, 2015

(54) METHOD AND SYSTEM FOR CONTROLLING ANTI-JERK OF HYBRID ELECTRIC VEHICLE

(71) Applicants: Hyundai Motor Company, Seoul (KR); Kia Motors Corporation, Seoul (KR)

(72) Inventors: Joung Chul Kim, Suwon-si (KR); Tai Jin Jung, Bucheon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 14/066,290

(22) Filed: Oct. 29, 2013

(65) Prior Publication Data

US 2014/0162840 A1    Jun. 12, 2014

(30) Foreign Application Priority Data

Dec. 7, 2012  (KR) ................. 10-2012-0142061

(51) Int. Cl.
*B60W 10/02* (2006.01)
*B60W 20/00* (2006.01)
*B60W 10/08* (2006.01)
*B60W 10/11* (2012.01)
(Continued)

(52) U.S. Cl.
CPC ............... *B60W 20/30* (2013.01); *B60W 10/08* (2013.01); *B60W 10/11* (2013.01); *B60W 30/19* (2013.01); *B60K 2006/4825* (2013.01);
(Continued)

(58) Field of Classification Search
CPC ..... B60W 10/02; B60W 20/10; B60W 20/20; B60W 20/30; B60W 20/40; B60W 2510/02; B60W 2510/108; B60W 2510/0208; B60W 2510/1085; B60W 2510/0275; B60W 2510/1075; B60W 2710/02; B60W 2710/027; B60W 2710/1077; B60W 2710/1083; B60W 2710/1088
USPC ......... 477/3, 5, 6, 77, 79, 143, 156, 158, 168; 701/67–68
See application file for complete search history.

(56) References Cited

U.S. PATENT DOCUMENTS 7,686,738 B2 *  3/2010  Nohara et al. ................. 477/143
8,060,266 B2 * 11/2011  Hidaka et al. .................. 701/22
(Continued)

FOREIGN PATENT DOCUMENTS

EP        320261 A1 *  6/1989 ............ B60K 41/02
EP       1642796 A2 *  4/2006 ............ B60W 30/20
(Continued)

*Primary Examiner* — Roger Pang
*Assistant Examiner* — Tinh Dang
(74) *Attorney, Agent, or Firm* — McDermott Will & Emery LLP

(57) ABSTRACT

A method and system for controlling anti-jerk of a hybrid vehicle reduce shift vibration and shock by reverse phase controlling a drive motor during gear-shifting of a hybrid vehicle without a torque converter. The method includes determining whether a gear-shifting command is outputted from a transmission control unit of the hybrid vehicle; when it is determined that the gear-shifting command is outputted, confirming a gear-shifting range divided into at least three phases in accordance with the gear-shifting command; determining whether the corresponding divided gear-shifting range is an anti-jerk allowed gear-shifting range; and when it is determined that the corresponding gear-shifting range is the anti-jerk allowed gear-shifting range, reverse phase controlling a drive motor of the hybrid vehicle by a predetermined value in order to reduce or attenuate vibration and shock generated in the corresponding gear-shifting range.

5 Claims, 5 Drawing Sheets

(51) Int. Cl.
*B60W 30/19* (2012.01)
*B60K 6/48* (2007.10)

(52) U.S. Cl.
CPC ....... *B60W 2520/10* (2013.01); *B60W 2540/10* (2013.01); *B60W 2710/083* (2013.01); *B60W 2710/1005* (2013.01); *Y02T 10/6252* (2013.01); *Y02T 10/7258* (2013.01); *Y10S 903/902* (2013.01); *Y10T 477/26* (2015.01); *Y10T 477/33* (2015.01)

(56) References Cited

U.S. PATENT DOCUMENTS

| | | | |
|---|---|---|---|
| 8,116,957 B2 * | 2/2012 | Oh et al. | 701/67 |
| 8,447,482 B2 * | 5/2013 | Tomoda | 701/67 |
| 8,538,618 B2 * | 9/2013 | Nissato | 701/22 |
| 2007/0056784 A1 * | 3/2007 | Joe et al. | 180/65.2 |
| 2008/0020897 A1 * | 1/2008 | Honma et al. | 477/149 |
| 2008/0032861 A1 * | 2/2008 | Maki et al. | 477/143 |
| 2008/0139364 A1 * | 6/2008 | Lee | 477/143 |
| 2011/0009237 A1 * | 1/2011 | Kim et al. | 477/5 |
| 2013/0029805 A1 * | 1/2013 | Matsuo et al. | 477/5 |

FOREIGN PATENT DOCUMENTS

| | | | |
|---|---|---|---|
| JP | 2006-097622 A | | 4/2006 |
| JP | 2007-224886 A | | 9/2007 |
| KR | 10-1117970 B1 | | 2/2012 |
| KR | 2012-0053303 A | | 5/2012 |

* cited by examiner

METHOD AND SYSTEM FOR CONTROLLING ANTI-JERK OF HYBRID ELECTRIC VEHICLE

CROSS-REFERENCE TO RELATED APPLICATION

This application claims priority to and the benefit of Korean Patent Application No. 10-2012-0142061 filed in the Korean Intellectual Property Office on Dec. 7, 2012, the entire contents of which are incorporated herein by reference.

TECHNICAL FIELD

The present disclosure relates to a method and a system for controlling anti-jerk of a hybrid vehicle in which shift vibration and shock are reduced by reverse phase controlling of a drive motor during gear-shifting of a hybrid vehicle without a torque converter.

BACKGROUND

As well known, a hybrid vehicle (a hybrid electric vehicle) uses an internal combustion engine and a battery power supply together. That is, the hybrid vehicle uses power of the internal combustion engine and power of the drive motor that are efficiently combined with each other.

The hybrid vehicle, for example, as shown in FIG. 1, may include an engine 10, a drive motor 20, an engine clutch 30 for controlling power transmission between the engine 10 and the drive motor 20, a transmission 40, a differential gear 50, a battery 60, an integrated starter-generator 70 for starting the engine 10 or generating power by torque of the engine 10, and wheels 80.

In addition, the hybrid vehicle may include a hybrid control unit (HCU) 200 for controlling an entire operation of the hybrid vehicle, an engine control unit (ECU) 110 for controlling an operation of the engine 10, a motor control unit (MCU) 120 for controlling an operation of the drive motor 20, a transmission control unit (TCU) 140 for controlling an operation of the transmission 40, and a battery control unit (BCU) 160 for controlling and managing the battery 60.

The BCU 160 may be a battery management system (BMS). The integrated starter-generator 70 may be an integrated starter and generator (ISG) or a hybrid starter and generator (HSG).

The above-described hybrid vehicle may be driven in travel modes such as an electric vehicle (EV) mode, a pure hybrid vehicle mode, in which only the power of the drive motor 20 is employed, a hybrid electric vehicle (HEV) mode in which the torque of the engine 10 is used as main power and the torque of the drive motor 20 is used as an auxiliary power, and a regenerative braking (RB) mode in which brake and inertia energy is collected by power generation of the drive motor 20 to be charged in the battery 60 when a vehicle is braked or travels by inertia.

As described above, the hybrid vehicle uses the mechanical energy of the engine and the electrical energy of the battery together, and optimal operation regions of the engine and the drive motor, and the hybrid vehicle collects energy by the drive motor when is braked. These enhance fuel consumption and efficient use of energy.

In the above-described hybrid vehicle, since the engine clutch is used instead of a torque converter, and the engine and an automatic transmission are combined with each other, a drawback exists that a mechanical (passive) damping effect cannot be obtained, which the conventional torque converter has.

In the hybrid vehicle, since an additional damping unit is excluded or the damping unit becomes smaller, vibration of a drive shaft is generated and an shock phenomenon such as shock and jerk (momentary rapid movement) is generated during gear-shifting, tip-in/out (an operation of stepping on or taking a foot off an accelerator pedal), and combination of the engine clutch. These deteriorate ride comfort and drivability.

That is, since the damping unit between a torque source (an engine and a motor) and a driving system is excluded or the damping unit is small in the above-described hybrid vehicle, another problem exists that vibration from the torque source, vibration during gear-shifting, and vibration from the outside are not easily offset.

The drivability and ride comfort of the hybrid vehicle may not be good when the vibration from the torque source or the vibration from the outside is not effectively reduced.

In the conventional art for addressing the above problem, anti-jerk is performed by delaying ignition timing through the engine control unit (ECU).

An example of the conventional art is disclosed in Japanese Patent Laid-Open Publication No. 2006-97622.

Since the Japanese Patent Laid-Open Publication No. 2006-97622 is provided to stop anti-jerk during launch of a creep or gear-shifting in order to reduce unintended shock caused by anti-jerk, a problem exists that jerk is not substantially reduced.

The above information disclosed in this Background section is only for enhancement of understanding of the background of the invention and therefore it may contain information that does not form the prior art that is already known in this country to a person of ordinary skill in the art.

The above information disclosed in this Background section is only for enhancement of understanding of the background of the invention and therefore it may contain information that does not form the prior art that is already known in this country to a person of ordinary skill in the art.

SUMMARY

Therefore, an object of the present disclosure is to provide a method and a system for controlling anti-jerk of a hybrid vehicle in which a shift shock is reduced by reverse phase controlling a drive motor during gear-shifting of a hybrid vehicle without a torque converter.

Another object of the present invention is to provide a method and a system for controlling the anti-jerk of a hybrid vehicle in which a gear-shifting range is divided into a range in which anti-jerk is allowed and a range in which anti-jerk is prohibited, and a drive motor is reverse phase controlled using a motor control unit (MCU) in the range where anti-jerk is allowed so that shock in accordance with gear-shifting is reduced.

An exemplary embodiment provides a method of controlling the anti-jerk of a hybrid vehicle without a torque converter. The method includes determining whether a gear-shifting command is outputted from a transmission control unit of the hybrid vehicle, when it is determined that the gear-shifting command is outputted, confirming a gear-shifting range divided into at least three phases in accordance with the gear-shifting command, determining whether the corresponding divided gear-shifting range is an anti-jerk allowed gear-shifting range, and, when it is determined that the corresponding gear-shifting range is the anti-jerk allowed gear-shifting range, reverse phase controlling a drive motor of the hybrid vehicle by a predetermined value in order to reduce or attenuate vibration and shock generated in the corresponding gear-shifting range.

The gear-shifting command may be generated based on a vehicle speed signal and an accelerator pedal sensor (APS) signal.

The gear-shifting range may be divided into, at least, a gear-shifting preparing range, an actual gear-shifting range, and a gear-shifting terminating range.

The gear-shifting preparing range and the gear-shifting terminating range may be set as anti-jerk allowed ranges and the actual gear-shifting range may be set as an anti-jerk prohibited range.

The gear-shifting preparing range and the gear-shifting terminating range may be set as ranges in which only a torque level of a transmission by hydraulic pressure control is changed without a change in a gear ratio when gear-shifting is performed. The actual gear-shifting range may be set as a range in which the gear ratio is changed in order to follow a target gear ratio when gear-shifting is performed.

The divided gear-shifting ranges may be matched to anti-jerk allowed ranges or anti-jerk prohibited ranges to form a map.

Another exemplary embodiment encompasses a system for controlling the anti-jerk of a hybrid vehicle driven by a proper combination of power of an engine and power of a drive motor. The system includes an engine clutch for controlling power transmission between the engine and the drive motor, an accelerator pedal manipulated by a driver, a vehicle speed sensor for sensing a vehicle speed of the hybrid vehicle, a transmission control unit for controlling a transmission of the hybrid vehicle, a motor control unit for controlling the drive motor of the hybrid vehicle, and an anti-jerk control unit for controlling anti-jerk when gear-shifting is performed based on signals of the accelerator pedal, the vehicle speed sensor, the transmission control unit, and the motor control unit. The anti-jerk control unit may be operated by a predetermined program for performing the method of controlling anti-jerk of a hybrid vehicle according to the embodiment.

The embodiments reduce shift shock effectively and correctly by reverse phase controlling the drive motor during gear-shifting of the hybrid vehicle without the converter.

The gear-shifting range is divided into anti-jerk allowed ranges and anti-jerk prohibited ranges and the drive motor is reverse phase controlled using the MCU in the anti-jerk allowed ranges so that shock in accordance with gear-shifting may be efficiently reduced.

The anti-jerk is controlled by the drive motor having higher responsiveness and controllability than those of the engine so that anti-jerk performance may be improved.

DETAILED DESCRIPTION OF THE EMBODIMENTS

Figure 1:
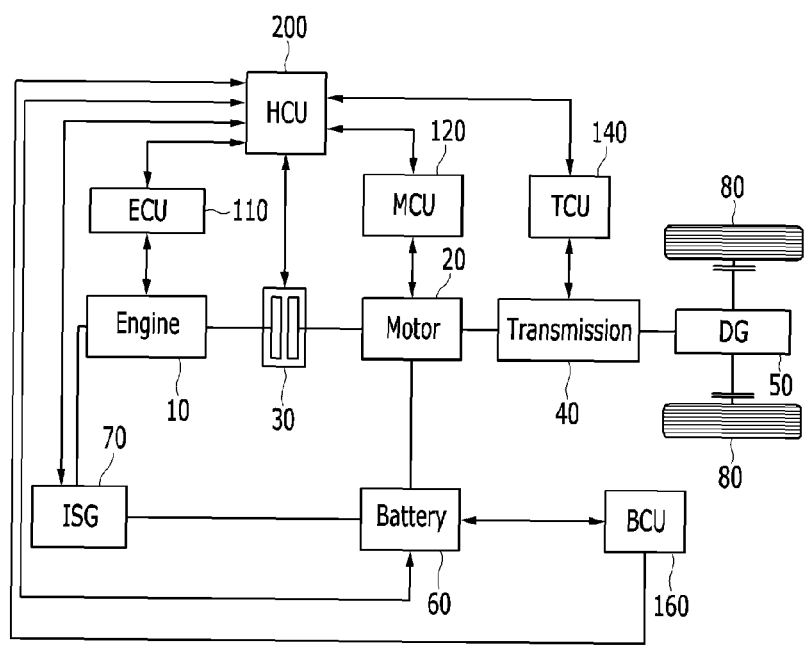
FIG. 1 is a schematic diagram of a common hybrid vehicle.

The present disclosure will be described more fully hereinafter with reference to the accompanying drawings, in which exemplary embodiments are shown. However, the present inventive concept is not limited to the exemplary embodiments described hereinafter but may be specified in other forms.

In addition, when, in the specification, it is referred that a part includes a certain constituent element, unless described to the contrary, it does not mean that other constituent elements are excluded but means that the constituent element may be further included.

In the entire specification, the same reference numerals represent the same constituent elements.

FIG. 1 is a view schematically showing a hybrid vehicle to which an anti-jerk control system according to an exemplary embodiment of the present disclosure is applied.

As shown in FIG. 1, a hybrid vehicle to which an anti-jerk control system according to an exemplary embodiment of the present disclosure is applied may include an engine 10, a motor 20, an engine clutch 30 for interrupting power between the engine 10 and the motor 20, a transmission 40, a differential gear 50, a battery 60, an integrated starting/generating motor 70 for starting the engine 10 or generating power by an output of the engine 10, wheels 80, a hybrid control unit (HCU) 200 for controlling an entire operation of the hybrid vehicle, a battery control unit (BCU) 160 for managing and controlling the battery 60, and a motor control unit (MCU) 120 for controlling an operation of the motor 20.

Figure 2:
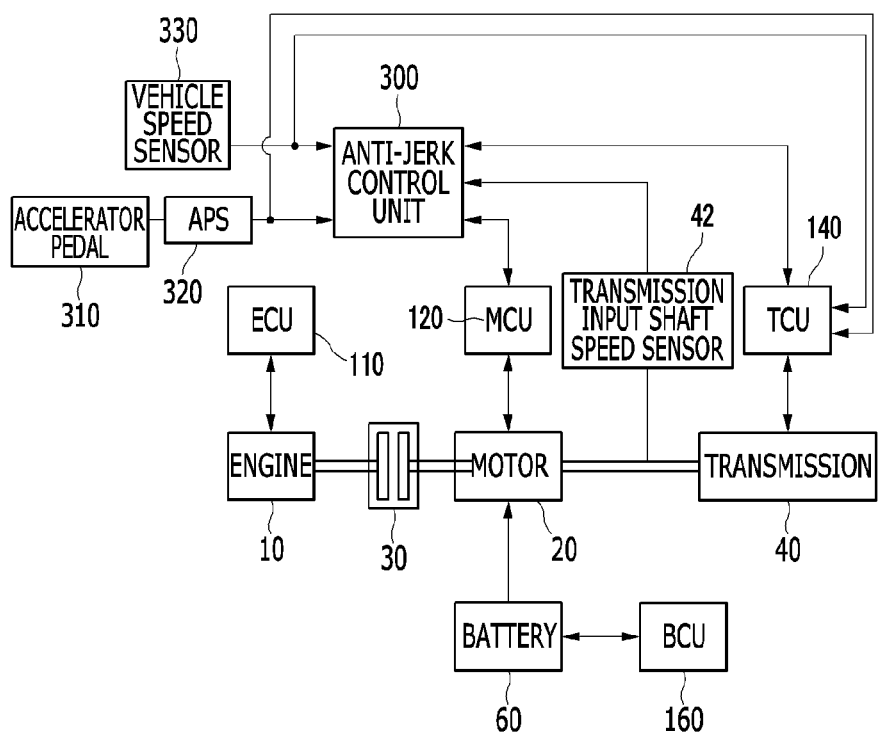
FIG. 2 is a schematic diagram of a system for controlling anti-jerk of a hybrid vehicle according to an exemplary embodiment of the present disclosure.

FIG. 2 is a block diagram showing an anti-jerk control system according to an exemplary embodiment of the present disclosure.

An anti-jerk system according to an exemplary embodiment of the present disclosure is an anti-jerk control system for suppressing or reducing vibration and shock generated during gear-shifting.

The anti-jerk system according to the exemplary embodiment of the present disclosure includes the engine clutch 30 for interrupting power connection between the engine 10 and the drive motor 20, an accelerator pedal 310 manipulated by a driver, a vehicle speed sensor 330 for sensing the speed of the hybrid vehicle, a transmission input shaft speed sensor 42 for sensing the input shaft speed of the transmission 40, a transmission control unit (TCU) 140 for controlling the transmission 40 of the hybrid vehicle, the MCU 120 for controlling the drive motor of the hybrid vehicle, and an anti-jerk control unit 300 for controlling the anti-jerk when gear-shifting is performed based on signals of the accelerator pedal 310, the vehicle speed sensor 330, the TCU 140, and the MCU 120.

The engine clutch 30 may be an engine clutch mounted in a common hybrid vehicle.

Due to the engine clutch 30, a torque converter mounted in a transmission of a common vehicle is removed from the hybrid vehicle to which the anti-jerk control system according to the exemplary embodiment of the present disclosure is applied. Thus, no torque converter exists in the hybrid vehicle to which the anti-jerk control system according to the exemplary embodiment of the present disclosure is applied.

The accelerator pedal 310 is a common accelerator pedal applied to a vehicle. The position of the accelerator pedal in accordance with the manipulation of the accelerator pedal 310 is detected by an accelerator position sensor (APS) 320. The APS 320 may be a common accelerator position sensor applied to a vehicle.

According to the embodiment of the present disclosure, the vehicle speed sensor 330 may be, for example, a vehicle speed sensor attached to a wheel to detect a rotation speed or, for example, a vehicle speed sensor attached to a final reduction gear of the transmission. However, it should be understood that the scope of the present disclosure is not limited thereto. Although another vehicle speed sensor is used, the spirit of the present inventive concept may be applied to any sensor that enables a value corresponding to an actual vehicle speed to be calculated.

The transmission input shaft speed sensor 42 may be a sensor provided in a common hybrid vehicle to sense the input shaft speed of the transmission 40.

Figure 4:
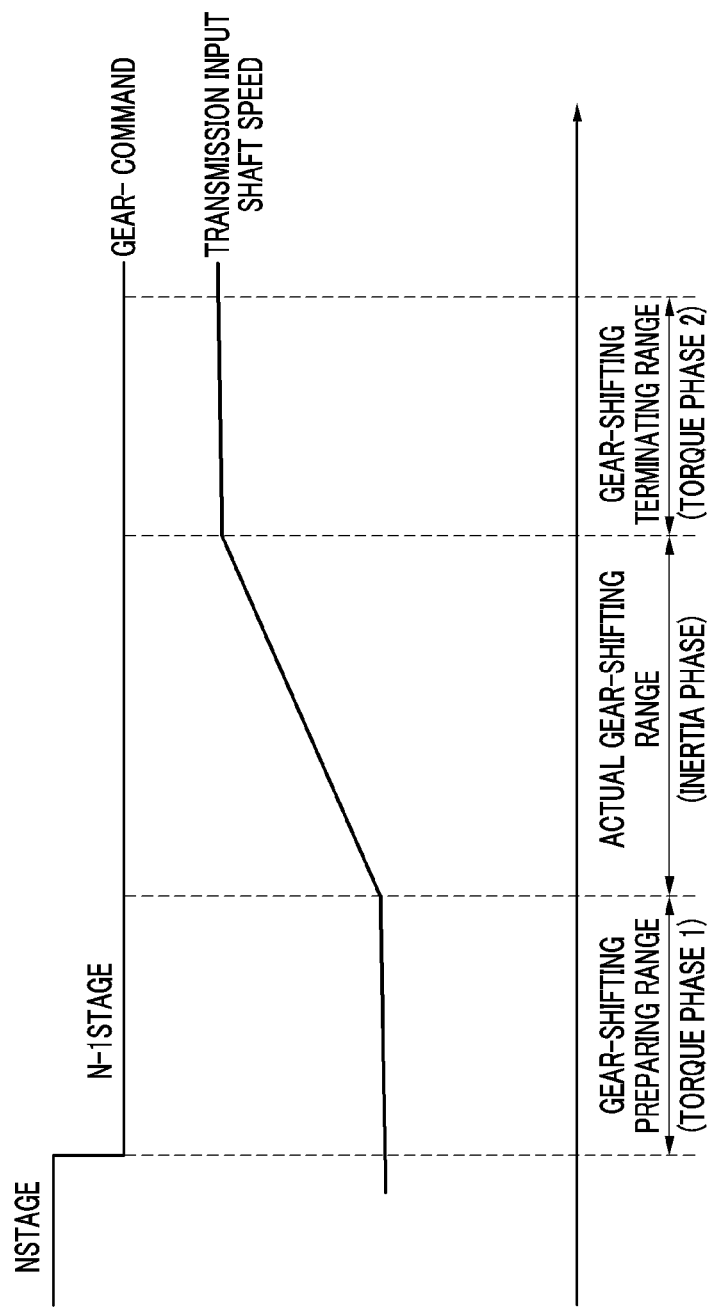
FIG. 4 is a graph showing divided gear-shifting ranges according to an exemplary embodiment of the present disclosure.
Figure 5:
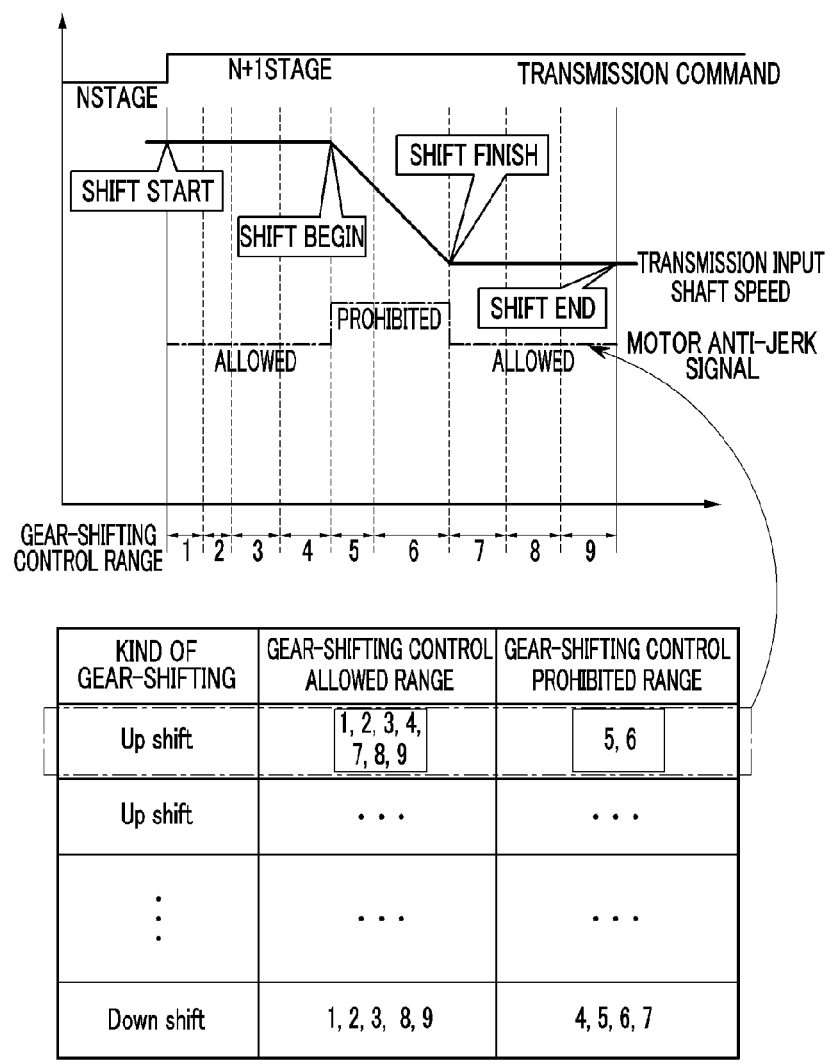
FIG. 5 is a graph showing anti-jerk allowed or prohibited ranges corresponding to the divided gear-shifting ranges according to an exemplary embodiment of the present disclosure.

As shown in FIGS. 4 and 5, the TCU 140 commands the transmission 40 to perform gear-shifting so that the gear-shifting is performed.

The TCU 140 may command the transmission 40 to perform the gear-shifting based on vehicle speed information and accelerator pedal position information.

The TCU 140 transmits a hydraulic pressure to a clutch in the transmission 40 using various information items such as a current gearshift and a target gearshift and torques of the engine 10 and the drive motor 20 to control gear-shifting.

As shown in FIGS. 4 and 5, the TCU 140 divides a gear-shifting range to control gear-shifting.

The gear-shifting range may be divided into various phases in accordance with a developer of the TCU.

The TCU 140 determines an anti-jerk allowing or prohibiting signal by phase in accordance with a gear-shifting characteristic to provide the determined anti-jerk allowing or prohibiting signal to the MCU 120.

The anti-jerk control unit 300 according to the exemplary embodiment of the present disclosure receives the anti-jerk allowing or prohibiting signal from the TCU 140 and/or the MCU 120 by each divided gear-shifting range to perform the anti-jerk during the gear-shifting.

The gear-shifting phases shown in FIGS. 4 and 5 may be differently used in accordance with the developer of the TCU. However, the shown three phases (a gear-shifting preparing range—an actual gear-shifting range—a gear-shifting terminating range) are commonly provided in the TCU.

In general, it is known that shift vibration and shock are generated in torque phase ranges corresponding to the gear-shifting preparing range and the gear-shifting terminating range during the gear-shifting.

Therefore, the anti-jerk control unit 300 according to the exemplary embodiment of the present disclosure performs the anti-jerk in the torque phase ranges and does not perform the anti-jerk in an inertia range corresponding to the actual gear-shifting range.

According to the exemplary embodiment of the present disclosure, the torque phase range may be defined as a gear-shifting control range in which only a torque level of a transmission clutch by hydraulic pressure control changes without a change in a gear ratio during gear-shifting control.

According to the exemplary embodiment of the present disclosure, the inertia phase range may be defined as a gear-shifting control range in which the gear ratio is changed to follow a target gear ratio and clutch slip is generated.

The anti-jerk control unit 300 is implemented by at least one microprocessor operated by a predetermined program or hardware elements including the microprocessor. The predetermined program includes a series of commands for performing a later-described anti-jerk control method according to an exemplary embodiment of the present disclosure.

According to the exemplary embodiment of the present disclosure, the anti-jerk control unit 300 may include a MCU for controlling the drive motor 20, a TCU for controlling the transmission 40, and a HCU for controlling an entire operation of the hybrid vehicle.

In the later-described anti-jerk control method according to the exemplary embodiment of the present disclosure, partial processes may be performed by the anti-jerk control unit and other partial processes may be performed the MCU, the TCU, or the HCU.

However, it should be understood that the scope of the present disclosure is not limited to description of later-described embodiments. A control unit may be realized by a combination of elements different from that described in the exemplary embodiment of the present disclosure. The anti-jerk control unit, the MCU, the TCU, and the HCU may perform processes of a combination different from that described in the exemplary embodiment of the present disclosure.

Hereinafter, a method of controlling anti-jerk of a hybrid vehicle according to an exemplary embodiment of the present disclosure will be described in detail with reference to the accompanying drawings.

Figure 3:
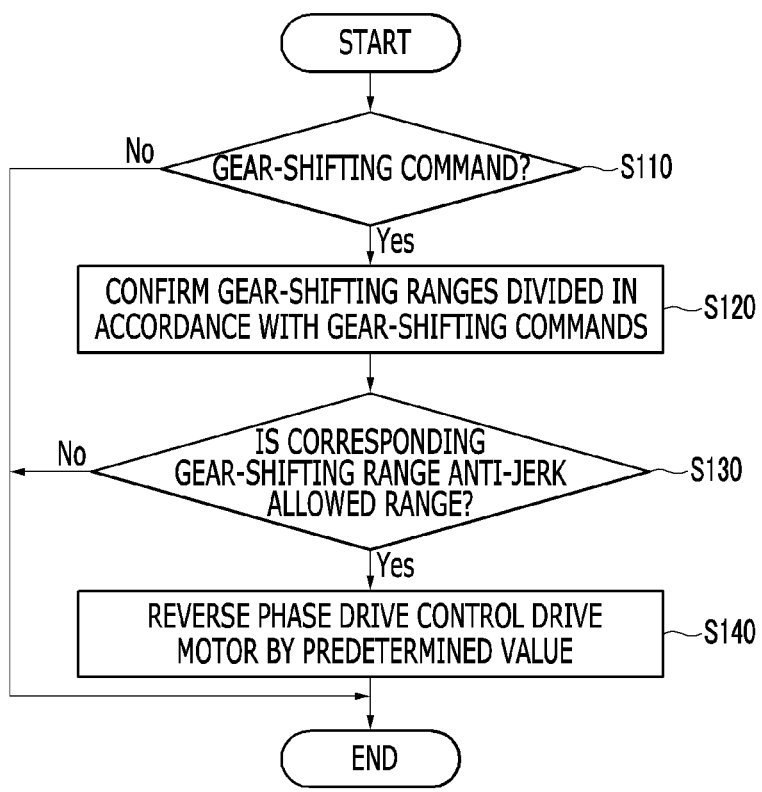
FIG. 3 is a flowchart of a method of controlling anti-jerk of a hybrid vehicle according to an exemplary embodiment of the present disclosure.

FIG. 3 is a flowchart showing a method of controlling anti-jerk of a hybrid vehicle according to an exemplary embodiment of the present disclosure.

As shown in FIG. 3, the anti-jerk control unit 300 determines whether a gear-shifting command for performing gear-shifting is outputted from the TCU 140 S110.

The TCU 140 may generate the gear-shifting command based on a vehicle speed signal and an APS signal.

The vehicle speed signal is sensed by the vehicle speed sensor 330 to be outputted. The APS signal is outputted by the APS 320.

The TCU 140 provides information on the gear-shifting preparing range, the actual gear-shifting range, and the gear-shifting terminating range as shown in FIGS. 4 and 5 when the gear-shifting command is outputted.

The gear-shifting command shown in FIG. 4 is a down shift command and the gear-shifting command shown in FIG. 5 is an up shift command.

When it is determined in S110 that the gear-shifting command is outputted by the TCU 140, the anti-jerk control unit 300 confirms information on the gear-shifting preparing range, the actual gear-shifting range, and the gear-shifting terminating range provided to the MCU 120 S120.

In FIG. 5, the starting point of the gear-shifting preparing range is defined as shift start, and the ending point of the gear-shifting preparing range (or a starting point of the actual gear-shifting range) is defined as shift begin. The ending point of the actual gear-shifting range (or a starting point of the gear-shifting terminating range) is defined as shift finish, and the ending point of the gear-shifting terminating range is defined as shift end.

The shift start is a point in time when a gear-shifting control start command is generated. The shift begin is a slip starting point of a transmission clutch when an actual gear ratio change is generated in a transmission. The shift finish is a point in time when an actual gear ratio change of the transmission is completed. The shift end is a point in time when gear-shifting control is completed.

The anti-jerk control unit 300 sets the gear-shifting preparing range and the gear-shifting terminating range as the anti-jerk allowed ranges and sets the actual gear-shifting range as an anti-jerk prohibiting range.

The anti-jerk control unit 300 sets the gear-shifting preparing range and the gear-shifting terminating range as ranges in which only the torque level of the transmission by the hydraulic pressure control is changed without a change in the gear ratio when gear-shifting is performed and sets the actual gear-shifting range as a range in which the gear ratio is changed in order to follow the target gear ratio when gear-shifting is performed.

The gear-shifting preparing range, the gear-shifting terminating range, and the actual gear-shifting range may be further divided as shown in FIG. 5.

For example, as shown in FIG. 5, the gear-shifting preparing range may be divided into ranges 1 to 4, the actual gear-shifting range may be divided into ranges 5 and 6, and the gear-shifting terminating range may be divided into ranges 7 to 9.

As shown in the table of FIG. 5, the divided gear-shifting ranges may be matched to the anti-jerk allowed ranges or the anti-jerk prohibited ranges to form a map. The map may be stored in the anti-jerk control unit 300 to be used.

When information on the respective gear-shifting ranges is confirmed in S120, the anti-jerk control unit 300 determines whether a corresponding gear-shifting period is the anti-jerk allowed period when gear-shifting control is performed by the TCU 140 S130.

When it is determined in S130 that the corresponding gear-shifting range is the anti-jerk allowed range, the anti-jerk control unit 300 performs a reverse phase control on the drive motor 20 of the hybrid vehicle by a predetermined value in order to reduce or attenuate vibration and shock generated in the corresponding gear-shifting range S140.

The anti-jerk control unit 300 controls a current applied to the drive motor 20 to perform the reverse phase drive control.

Therefore, according to the exemplary embodiment of the present disclosure, during the gear-shifting of the hybrid vehicle, the shift vibration and shock may be effectively reduced and attenuated by the reverse phase controlling of the drive motor.

While this invention has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method of controlling anti-jerk of a hybrid vehicle without a torque converter, comprising:
   determining whether a gear-shifting command is outputted from a transmission control unit of the hybrid vehicle;
   confirming a gear-shifting range divided into at least three phases in accordance with the gear-shifting command, when it is determined that the gear-shifting command is outputted;
   determining whether the corresponding divided gear-shifting range is an anti-jerk allowed gear-shifting range; and
   reverse phase controlling, by a motor control unit, a drive motor of the hybrid vehicle by a predetermined value in order to reduce or attenuate vibration and shock generated in the corresponding gear-shifting range, when it is determined that the corresponding gear-shifting range is the anti-jerk allowed gear-shifting range,
   wherein the gear-shifting range is divided into, at least, a gear-shifting preparing range, an actual gear-shifting range, and a gear-shifting terminating range, and
   wherein the gear-shifting preparing range and the gear-shifting terminating range are set as anti-jerk allowed ranges and the actual gear-shifting range is set as an anti jerk prohibited range.

2. The method of claim 1, wherein the gear-shifting command is generated based on a vehicle speed signal and an accelerator pedal sensor (APS) signal.

3. The method of claim 1 wherein the gear-shifting preparing range and the gear-shifting terminating range are set as ranges in which only a torque level of a transmission by hydraulic pressure control is changed without a change in a gear ratio when gear-shifting is performed, and
   wherein the actual gear-shifting range is set as a range in which the gear ratio is changed in order to follow a target gear ratio when gear-shifting is performed.

4. The method of claim 1, wherein the divided gear-shifting ranges are matched to anti-jerk allowed ranges or anti-jerk prohibited ranges to form a map.

5. A system for controlling anti-jerk of a hybrid vehicle driven by a proper combination of power of an engine and power of a drive motor, comprising:
   an engine clutch for controlling power transmission between the engine and the drive motor;
   an accelerator pedal manipulated by a driver;
   a vehicle speed sensor for sensing a vehicle speed of the hybrid vehicle;
   a transmission control unit for controlling a transmission of the hybrid vehicle;
   a motor control unit for controlling the drive motor of the hybrid vehicle; and
   an anti-jerk control unit for controlling the anti-jerk when gear-shifting is performed based on signals of the accelerator pedal, the vehicle speed sensor, the transmission control unit, and the motor control unit,
   wherein the anti-jerk control unit is operated by a predetermined program for performing any one of claims 1, 2, 3, and 4.

* * * * *